No. 881,186. PATENTED MAR. 10, 1908.
J. HULINGS & S. B. CRAIG.
FRUIT PULPING APPARATUS.
APPLICATION FILED APR. 9, 1906.

Witnesses:
Chas. F. Bassett
M. A. Milord

Inventors
John Hulings
Samuel B. Craig
By Frederick Benjamin
Atty.

THE NORRIS PETERS CO., WASHINGTON, D. C.

UNITED STATES PATENT OFFICE.

JOHN HULINGS AND SAMUEL B. CRAIG, OF HASTINGS, MICHIGAN.

FRUIT-PULPING APPARATUS.

No. 881,186.     Specification of Letters Patent.     Patented March 10, 1908.

Application filed April 9, 1906. Serial No. 310,699.

*To all whom it may concern:*

Be it known that we, JOHN HULINGS, and SAMUEL B. CRAIG, citizens of the United States, residing at Hastings, in the county of Barry and State of Michigan, have invented certain new and useful Improvements in Fruit-Pulping Apparatus, of which the following is a specification.

Our invention relates to apparatus for pulping fruit of various sorts and expressing the juices therefrom and belongs especially to that class of devices in which the process is continuous.

The principal objects of our invention are;
first, to produce a simple fruit pulping and juices extracting machine having few parts, thus rendering the mechanism more durable, less likely to get out of order and reducing the cost of manufacture; and to produce an apparatus for pulping and pressing fruit that will give the highest efficiency thus increasing the output from a given quantity of material and reducing the required time to a minimum. We accomplish these and other minor advantages by the use of a crushing or grating apparatus mounted upon a suitable framework in which are likewise mounted a series of rotating cylinders adapted to coöperate with an endless curtain to compress the pulp or pomace and thus express the juice therefrom, suitable means being provided for conveying the liquid product to storage tanks.

Figure 1:
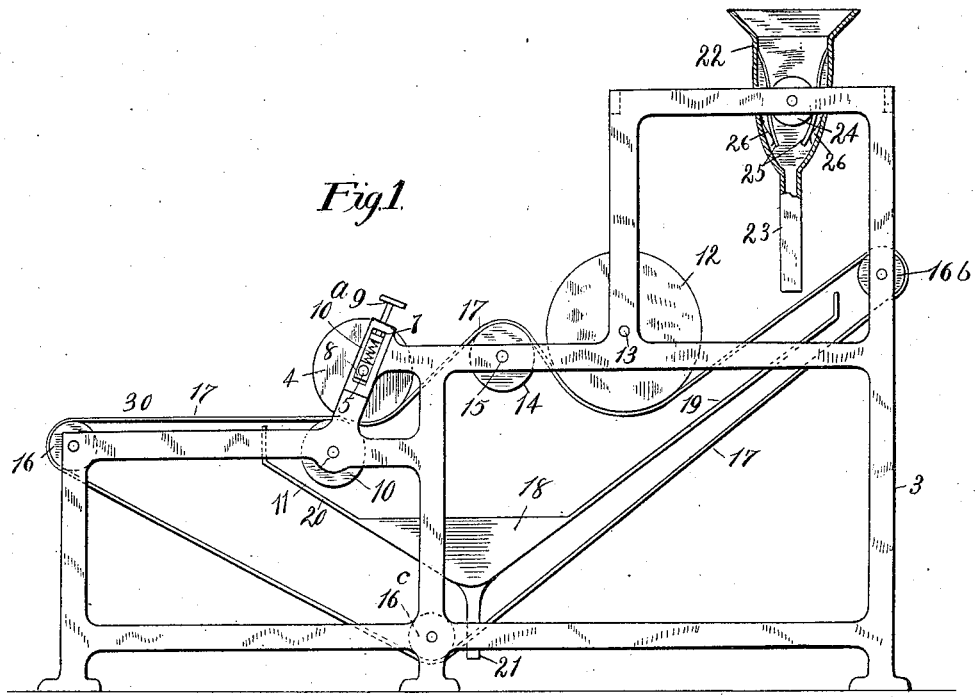
Figure 2:
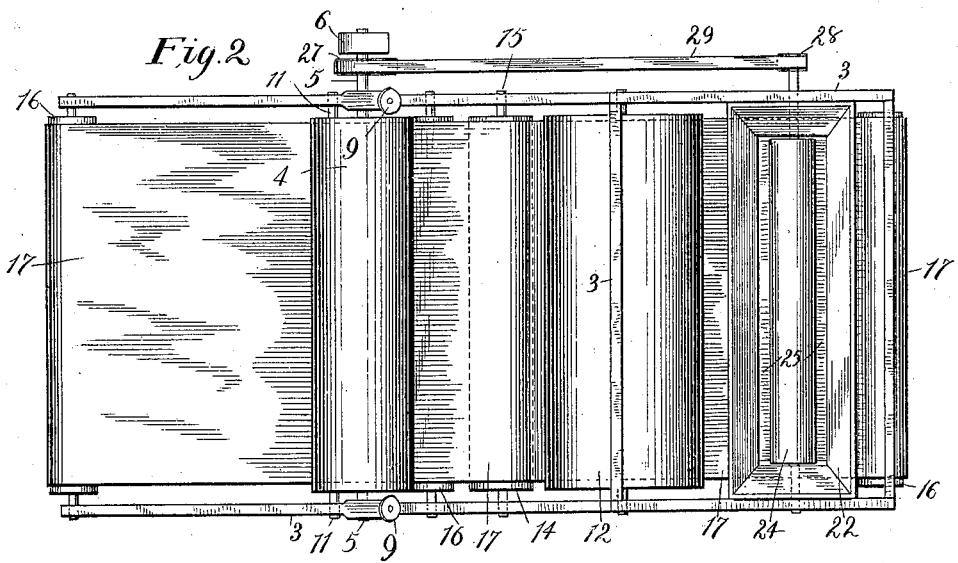

In the accompanying drawing which forms a part of this specification:—Figure 1 is a side elevation of a combined fruit pulping and juice expressing apparatus embodying our improvements, and Fig. 2 is a top plan view of the same.

Referring to the drawing the numeral 3 indicates the framework of the machine in which is mounted a pressure cylinder 4, its shaft 5, upon which is a driving pulley 6, being journaled in floating boxes 8, adapted to have a nearly vertical movement in a guide-way 7 in the frame 3. The position of said boxes 8 in the guideway is regulated by hand screws 9, springs $10^a$ being interposed between the screws and said boxes to relieve the tension and to afford a certain automatic adjustment of the interval between said cylinder 4 and its companion roller 10 the shaft 11 of which is journaled in fixed bearings in the frame 3. At some point between the pressure cylinder and the crushing mechanism, hereinafter described, is placed a drum 12 of considerably larger diameter than the pressure cylinder 4, its shaft 13 having fixed bearings in the frame 3. Between the drum 12 and the cylinder 4 is located a roller 14 journaled at 15 in the main frame.

An endless apron 17, preferably composed of canvas or some similar material combining strength with flexibility and pervious to liquids, passes over the rollers 14 and 10 and is supported by them and also by the idlers 16, $16^a$, $16^b$, which serve to keep the apron taut and direct its course so as to form a wide interval between its upper and lower web in which interval or space is located a drip pan 18 provided with a rearwardly extending projection 19 and a forwardly extending portion 20, and having an outlet spout 21 at the lowest depending part through which the liquid contents of the pan can be led to storage tanks.

Above the endless apron 17 is placed the pulping mechanism which is here shown in the form of a grater or grinder, although any desirable form of apparatus suited to any special process or variety of fruit, may be substituted therefor. To receive the fruit to be operated upon, a hopper 22 is provided having an outlet, or pomace tube 23, and securely fixed in the frame 3. Within said hopper is rotatably mounted a cylindrical grater 24 which coöperates with lateral plates 25 kept in apposition with the grater by springs 26.

A pulley 27 is mounted on the shaft 5 of the pressure cylinder 4 and serves to transmit power through a belt 29 to a pulley 28 fixed on the shaft of the grater 24.

The operation of the machine is as follows:—The fruit to be pulped is placed in the hopper 22 where the grater 24 reduces it to the required degree of fineness. The apron 17 where it passes over the rear idler $16^b$ is elevated considerably above the remaining portions and thus forms an incline directly beneath the pomace tube 23 which continues until the drum 12 is reached, around which the apron passes for a portion of its circumference, taking an upward direction as it runs over the roller 14. It will be seen that the freshly grated pomace will fall into a trough or channel formed between the incline and the face of the drum. A large proportion of the juices will pass through the porous apron at this depending portion by gravity and the action of the drum upon the slightly yielding canvas will express a still larger amount of the remaining juice. The inward movement of the apron will then carry the pomace over the roller 14 where the apron again dips downward to the pressure cylinder 4, this declivity lending aid in directing the material beneath the said cylinder where it is retained by the yielding canvas with sufficient tenacity to cause it to pass between the cylinder 4 and roller 10 where it receives a final and sufficiently powerful pressure to force out the residual liquid which the pomace has retained up to this point, the expressed juice passing through the reticulations of the canvas apron to fall upon the extension 20 whence it drains into the main portion of the pan 18. The pomace, thus practically deprived of its juices, is carried along the level portion 30 of the apron until it reaches the idler 16 over which it passes to fall by gravity into a suitable receptacle placed to receive it.

Having thus described our invention what we claim, is:—

An apparatus for the purpose specified, including a frame, a juice expressing mechanism mounted on said frame and comprising an endless apron, a series of pressure members mounted above and below said apron and in engagement therewith and consisting of a drum 12, a roller 14, and adjustably mounted roller 4, and a drip pan 18, arranged below the upper course of said apron, and having projections extending below and beyond said rollers and having vertical upturned margins, said pan also having a discharge spout, substantially as described.

In testimony whereof we affix our signatures in presence of witnesses.

JOHN HULINGS.
SAMUEL B. CRAIG.

Witnesses:
  M. W. RIKER,
  L. A. ENTOM,
  H. F. WOOLFE.